US012646961B2

(12) United States Patent
Sundar et al.

(10) Patent No.: US 12,646,961 B2
(45) Date of Patent: Jun. 2, 2026

(54) BATTERY CHARGING WITH CHARGE CURRENT THROTTLING TO ASSIST MINIMUM SYSTEM VOLTAGE REGULATION

(71) Applicant: DIALOG SEMICONDUCTOR (UK) LIMITED, London (GB)

(72) Inventors: Arun Sundar, Campbell, CA (US); Jinseok Park, San Jose, CA (US); Amit Jain, Dublin, CA (US); Aravind Mangudi, Gilbert, AZ (US)

(73) Assignee: RENESAS DESIGN (UK) LIMITED (GB)

( * ) Notice: Subject to any disclaimer, the term of this patent is extended or adjusted under 35 U.S.C. 154(b) by 996 days.

(21) Appl. No.: 17/671,362

(22) Filed: Feb. 14, 2022

(65) Prior Publication Data

US 2023/0261496 A1     Aug. 17, 2023

(51) Int. Cl.
 H02J 7/00 (2026.01)
 H02M 1/00 (2007.01)
 H02M 3/156 (2006.01)
(52) U.S. Cl.
 CPC ....... H02J 7/00714 (2020.01); H02J 7/00711 (2020.01); H02M 3/156 (2013.01); *H02J 7/007182* (2020.01); *H02J 2207/20* (2020.01); *H02M 1/0009* (2021.05); *H02M 1/0025* (2021.05); *Y02B 70/10* (2013.01)
(58) Field of Classification Search
 CPC .............. H02J 7/00714; H02J 7/00711; H02J 7/007182; H02J 2207/20; H02M 3/156; H02M 1/0009; H02M 1/0025; Y02B 70/10

USPC ......................................................... 320/140
See application file for complete search history.

(56) References Cited

U.S. PATENT DOCUMENTS

| | | | | |
|---|---|---|---|---|
| 5,847,551 | A | * 12/1998 | Arora ........................ | G05F 1/59 |
| | | | | 323/224 |
| 2014/0176095 | A1* | 6/2014 | Yang ...................... | H02M 3/157 |
| | | | | 323/271 |
| 2015/0340897 | A1 | 11/2015 | Uan-Zo-Li | |
| 2016/0006272 | A1* | 1/2016 | Greening ............ | H02J 7/00712 |
| | | | | 320/162 |
| 2016/0059730 | A1* | 3/2016 | Ishibashi ................. | B60L 58/26 |
| | | | | 307/10.1 |

(Continued)

OTHER PUBLICATIONS

Office Action dated Feb. 27, 2025 from German application No. 10 2022 117 988.5, 4 pages.

*Primary Examiner* — Julian D Huffman
*Assistant Examiner* — Nathan J Instone
(74) *Attorney, Agent, or Firm* — Haynes and Boone, LLP

(57) ABSTRACT

A battery charger is provided that includes a switching power converter that regulates an output voltage on an output voltage rail. A transistor couples between the output voltage rail and a rechargeable battery for a system. An error amplifier controls the conductance of the transistor based upon a difference between a battery current conducted by the transistor to the battery and a battery current threshold. A pulse width modulator controls a duty cycle of the switching power converter responsive to a selected error signal from a group of error signals. Based upon which error signal is selected for the duty cycle control, the battery charger either increases or decreases the battery current threshold to assist in keeping the output voltage above a minimum system voltage for the system.

13 Claims, 8 Drawing Sheets

(56) References Cited

U.S. PATENT DOCUMENTS

2017/0187199 A1    6/2017  Wei

* cited by examiner

- Prior Art -

- Prior Art -

- Prior Art -

FIG. 4

VSYS_MIN

VSYS

VSYS_UNDER_TH

ISYS

VSYS_UNDER

EA_VOUT_IN_CTRL

IBAT

IBAT_CRIT

A  B  C  D  E

BATTERY CHARGING WITH CHARGE CURRENT THROTTLING TO ASSIST MINIMUM SYSTEM VOLTAGE REGULATION

TECHNICAL FIELD

This application relates to a switching power converter for charging a system battery, and more particularly to a switching power converter with charge current throttling to assist a minimum system voltage regulation.

BACKGROUND

Battery charging and power management is an essential part of systems with rechargeable batteries. A conventional battery charger 100 is shown in FIG. 1. Charger 100 includes a DC/DC switching power converter 105 such as a buck converter or a buck/boost converter that regulates an output voltage $V_{SYS}$ and an output current $I_{SYS}$ to power the system 150. DC/DC switching power converter 105 couples to a system 150 through an output power rail 106 that carries the output voltage $V_{SYS}$ and the output current $I_{SYS}$ for powering system 150. System 150 includes a re-chargeable battery 145 that couples to output power rail 106 through a transistor QBAT 140. An auxiliary error amplifier 135 controls the conductance of QBAT 140 based upon a difference between a battery current IBAT and a reference battery current $I_{BAT\_ref}$. System 150 may be any application with a re-chargeable battery such as a mobile device, a wearable device, or an internet-of-things device. Depending upon the conductance of the QBAT transistor 140, an output current $I_{OUT}$ from DC/DC switching power converter 105 is split into the output current $I_{SYS}$ to system 150 and the battery current $I_{BAT}$.

An AC/DC switching power converter (not illustrated) such as a flyback converter may rectify an AC mains voltage to function as an input power source to DC/DC switching power converter 105. With respect to receiving this input power, DC/DC switching power converter 105 has a variable input resistance as represented by a resistance $R_{IN}$. Input resistance $R_{IN}$ produces an ohmic drop on an output voltage $V_{IN\_TX\_RX}$ from the AC/DC switching power converter to produce an input voltage $V_{IN}$ to DC/DC switching power converter 105. The input voltage VIN is lower than the input voltage $V_{IN\_TX\_RX}$ by a product of the input resistance $R_{IN}$ and an input current $I_{IN}$ to DC/DC switching power converter 105. To regulate the input voltage VIN so that the input voltage VIN does not droop below a minimum input voltage, charger 100 includes an input voltage error amplifier (EA_VIN) 125 that produces an input voltage error signal responsive to a difference between the input voltage $V_{IN}$ and a reference input voltage $V_{IN\_ref}$. To regulate the input current $I_{IN}$ so that the input current $I_{IN}$ does not exceed a maximum input current, charger 100 includes an input current error amplifier (EA_$I_{IN}$) 130 that produces an input current error signal responsive to a difference between a reference input current $I_{IN\_ref}$ and the input current $I_{IN}$.

To regulate the battery current IBAT, charger 100 includes a battery current error amplifier (EA_$I_{BAT}$) 115 that produces a battery current error signal responsive to a difference between a reference current $I_{BAT\_ref}$ and the battery current $I_{BAT}$. To regulate a battery voltage VBAT for battery 145 or the output voltage $V_{SYS}$ provided to system 150, charger 100 (which may also be denoted as a power adapter 100) includes an output voltage error amplifier (EA_$V_{OUT}$) 120. Depending upon the selection in a multiplexer 155, the output voltage error amplifier 120 compares either the battery voltage $V_{BAT}$ or the output voltage $V_{SYS}$ to a voltage threshold $V_{OUT\_ref}$ to produce an output voltage error signal. The output voltage error signal is proportional to the difference between the voltage threshold $V_{OUT\_ref}$ and the selected voltage from multiplexer 155.

A pulse width modulation (PWM) modulator 110 may then control the duty cycle (d) of a power switch (not illustrated) in DC/DC switching power converter 105 responsive to a selected one of the output voltage error signal, the input current error signal, the input voltage error signal, and the battery current error signal. PWM modulator 110 may thus regulate the duty cycle of the power switch in any given switching cycle based upon one of the error signals from the four error amplifiers 115, 120, 125, and 130. During the initial stages of charging battery 145, the output voltage Vsvs is regulated to equal a minimum value $V_{SYS\_MIN}$. During these initial stages, multiplexer 155 thus selects for the output voltage $V_{SYS}$ and PWM modulator 110 adjusts the power switch duty cycle based upon the output voltage error signal accordingly. During this time, note that PWM modulator 110 cannot then respond to the battery current error signal. To allow charger 100 to continue to regulate the battery current $I_{BAT}$ despite the regulation of the output voltage $V_{SYS}$ to equal $V_{SYS\_MIN}$ during the initial battery charging stages, charger 100 includes the auxiliary error amplifier (EA_AUX) 135 that produces an auxiliary error signal for the battery current $I_{BAT}$ responsive to a difference between the battery current IBAT and the current threshold $I_{BAT\_ref}$. Depending upon the value of the auxiliary error signal, auxiliary error amplifier 135 regulates the conductance of the QBAT transistor 140 to regulate the battery current $I_{BAT}$. In this fashion, charger 100 may simultaneously regulate the battery voltage $V_{BAT}$ and the battery current $I_{BAT}$ while the output voltage $V_{SYS}$ is regulated to equal $V_{SYS\_MIN}$.

Note that the QBAT transistor 140 functions as a resistance to convert the output voltage $V_{SYS}$ into the battery voltage $V_{BAT}$ (and also the battery current $I_{BAT}$). The regulation of the battery current $I_{BAT}$ by the control of the conductance of QBAT by the auxiliary error amplifier 135 is thus effectively in series with respect to the regulation of the system voltage $V_{SYS}$. This is an important advantage for battery charger 100 as the feedback control of the battery current $I_{BAT}$ is thus substantially decoupled from the feedback control of the output voltage $V_{SYS}$.

Waveforms for the output voltage $V_{SYS}$, the battery voltage $V_{BAT}$, and the battery current $I_{BAT}$ during a charging of battery 145 are shown in FIG. 2. During a battery pre-charge (PRECHG) region while the battery voltage $V_{BAT}$ is very low (less than a battery pre-charge voltage $V_{BAT\_PRE\_CHG}$), charger 100 regulates the battery current $I_{BAT}$ to equal a constant value $I_{PRE\_CHG}$. As the battery voltage $V_{BAT}$ rises to be greater than the battery pre-charge voltage but less than a battery fast charge voltage ($V_{BAT\_FAST\_CHG}$), charger 100 operates in a trickle charge region during which the battery current $I_{BAT}$ is regulated to equal a constant trickle value ($I_{CHG\_TRICKLE}$). The output voltage $V_{SYS}$ is regulated to equal the minimum system voltage $V_{SYS\_MIN}$ during the pre-charge and trickle charge operating regions. As the battery voltage $V_{BAT}$ continues to rise greater than $V_{BAT\_FAST\_CHG}$ but not greater than $V_{SYS\_MIN}$, the battery current $I_{BAT}$ rises rapidly until it is regulated to equal a constant fast charge value $I_{FAST\_CHG}$. While the battery voltage $V_{BAT}$ is less than the minimum system voltage $V_{SYS\_MIN}$, multiplexer 155 selects for the system voltage $V_{SYS}$ so that PWM modulator 110 may regulate the duty cycle of the power switch transistor in DC/DC converter 105 based upon the output voltage error signal from the output voltage error amplifier 120. The auxiliary error amplifier 135 thus functions while the battery voltage $V_{BAT}$ is less than the minimum system voltage $V_{SYS\_MIN}$ to control the conductance of the QBAT transistor 140 to regulate the battery current $I_{BAT}$. The period during which auxiliary error amplifier 135 regulates the battery current $I_{BAT}$ is designated in FIG. 2 as a QBAT_REG operating region.

Once the battery voltage $V_{BAT}$ is greater than the minimum system voltage $V_{SYS\_MIN}$, the QBAT transistor 140 is fully on during a QBAT_ON operating region such that auxiliary error amplifier 135 can provide no further regulation of the battery current $I_{BAT}$. As the battery voltage $V_{BAT}$ rises past the minimum system voltage $V_{SYS\_MIN}$, PWM modulator 110 responds to the battery current error signal from battery current error amplifier 115 to regulate the battery current $I_{BAT}$ to the constant value $I_{FAST\_CHG}$ during a constant current (CC) operating region. At the same time, multiplexer 155 switches to select for the battery voltage $V_{BAT}$ so that PWM modulator 110 may respond to the error signal EA_VOUT to regulate the battery voltage $V_{BAT}$, which continues to rise to equal a maximum value $V_{BAT\_REG}$ during a constant voltage (CV) operating region. The QBAT_ON operating region thus consists of the CC and CV operating regions.

During the QBAT_REG operating region, the battery current $I_{BAT}$ is regulated to one of the three constant values $I_{PRE\_CHG}$, $I_{CHG\_TRICKLE}$ and $I_{FAST\_CHG}$. Should the battery current $I_{BAT}$ exceed a critical value $I_{BAT\_CRIT}$, it can be shown that PWM modulator 110 responds to one of input error signals EA_VIN and EA_IIN to adjust the duty cycle of the power switch. In this fashion, the battery current $I_{BAT}$ may be reduced to its appropriate constant value. But the output voltage $V_{SYS}$ may then droop below the minimum system voltage $V_{SYS\_MIN}$ during the QBAT_REG operating region. This is not desirable as system 150 may then malfunction due to system 150 not receiving the required minimum value $V_{SYS\_MIN}$ of the output voltage $V_{SYS}$.

To address this drooping of the output voltage $V_{SYS}$ during the QBAT_REG operating region, a shunt feedback loop may be used to control the conductance of the QBAT transistor 140 as shown in FIG. 3 for a battery charger 300. A voltage divider formed by a resistor R1 and R2 divides the output voltage $V_{SYS}$ to form a divided voltage. An auxiliary error amplifier 305 controls the conductance of the QBAT transistor 140 responsive to a difference between the divided voltage and a $V_{SYS}$ minimum reference voltage ($V_{SYS\_MIN\_ref}$). The remaining components of charger 300 are as discussed for charger 100. During the QBAT_REG operating region, the output current IOUT from converter 105 is controlled by one of the battery current $I_{BAT}$, the input voltage $V_{IN}$, or the input current $I_{IN}$. For a given value of the output current $I_{SYS}$, once the battery current $I_{BAT}$ is greater than the critical value, the output voltage $V_{SYS}$ will droop below the minimum system voltage $V_{SYS\_MIN}$. Error amplifier 305 may respond to this droop by decreasing the conductance of QBAT 140. This decrease in the conductance of QBAT 140 causes an increase in the output voltage $V_{SYS}$ since the output voltage $V_{SYS}$ equals the battery voltage $V_{BAT}$ plus a product of the battery current $I_{BAT}$ and the resistance of QBAT 140. The throttling of the battery current $I_{BAT}$ thus increases the output voltage $V_{SYS}$.

Note that the duty cycle of PWM modulator 110 is fixed by one of the input voltage $V_{IN}$ and the input current $I_{IN}$ when the battery current $I_{BAT}$ rises to the critical value $I_{BAT\_CRIT}$. Ideally, it may be assumed that the converter output current $I_{OUT}$ is fixed for any further increase in the load current $I_{SYS}$ such that the battery current $I_{BAT}$ will reduce as the load current $I_{SYS}$ increases. However, there is a complex interaction between the duty cycle control of the power switch transistor in converter 105 and conductance control of the QBAT transistor 140. This complex interaction makes the shunt feedback difficult to stabilize. Moreover, note that the battery current $I_{BAT}$ is relatively low during the battery pre-charge and trickle charge operating regions. The amount of the output current $I_{OUT}$ that can be shunted to the battery current $I_{BAT}$ during the battery pre-charge and trickle charge operating regions is thus relatively small and limits the dynamic range of the shunt feedback loop. Any additional current needed to minimize the $V_{SYS}$ droop must then be produced by a change in the duty cycle of the power switch, which depends upon the bandwidth of the battery current error amplifier 115 and a current sense circuit (not illustrated) for the sensing of the battery current $I_{BAT}$. But the current sense circuit and battery current error amplifier 115 are typically relatively low-bandwidth circuits.

Referring again to battery charger 100, the regulation of the conductance of the QBAT transistor 140 by the auxiliary error amplifier 135 is effectively in series with the regulation of output voltage $V_{SYS}$ such that there is relatively little interaction between these two feedback loops. To address the droop of the output voltage $V_{SYS}$, battery charger 100 may include a comparator (not illustrated) that triggers when the output voltage $V_{SYS}$ drops below a threshold voltage $V_{SYS\_UNDER\_TH}$. In response to this comparator triggering, a digital-to-analog converter (DAC) code to a DAC (not illustrated) that converts the code to produce the $I_{BAT\_ref}$ reference voltage may be reduced. But the resulting regulation of the output voltage $V_{SYS}$ is still subject to droops and overshoots as shown in FIG. 4. At a time A, the output current $I_{SYS}$ (which may also be designated as a load current) increases due to a load demand by system 150. The output voltage $V_{SYS}$ then begins to droop below the minimum system voltage $V_{SYS\_MIN}$ and reaches the threshold voltage $V_{SYS\_UNDER\_TH}$ at a time B. The droop in the output voltage $V_{SYS}$ at time A causes the comparator to trigger such that the DAC code begins to be successively reduced at a time B. Prior to time B, the battery current $I_{BAT}$ was above the critical level $I_{BAT\_CRIT}$. The toggling of the DAC code beginning at time B causes the battery current $I_{BAT}$ to fall below the critical level $I_{BAT\_CRIT}$. The output voltage $V_{SYS}$ then recovers at a time C. The DAC code is then progressively increased back towards its normal operating level. The battery current $I_{BAT}$ then increases to equal the critical value $I_{BAT\_CRIT}$, which causes the output voltage $V_{SYS}$ to again collapse. The collapse of the output voltage $V_{SYS}$ cause the comparator to again trigger at a time D, whereupon the output voltage $V_{SYS}$ again recovers to the minimum system level $V_{SYS\_MIN}$. At a time E, the load current $I_{SYS}$ reduces at a relatively-fast slew rate. Since the DAC code was being progressively increased around time E, the reduction in the load current $I_{SYS}$ causes the output voltage $V_{SYS}$ to exceed the minimum system voltage $V_{SYS\_MIN}$.

Accordingly, there is a need in the art for improved throttling of a battery current to reduce a droop in a system voltage below a minimum system voltage in a power adapter with a DC/DC switching power converter that regulates the system voltage on an output power rail for powering a system, the power adapter being further configured to control a conductance of a battery power switch transistor coupled to the output power rail to regulate the battery current responsive to a difference between the battery current and a reference battery current.

SUMMARY

In accordance with a first aspect of the disclosure, a switching power converter controller is provided that includes: a pulse width modulator configured to control a duty cycle of a switching power converter responsive to a selection from a group of error signals including an input voltage error signal based upon an error in an input voltage to the switching power converter, an input current error signal based upon an error in an input current to the switching power converter, and an output voltage error signal based upon an error in an output voltage of the switching power converter; a battery current error amplifier configured to generate a battery current error signal based upon a difference between a battery current and a battery current threshold, wherein the battery current error amplifier is further configured to control a conductance of a transistor responsive to the battery current error signal to control a magnitude of the battery current; and a battery current throttle circuit configured to increase the battery current threshold responsive to the selection of the output voltage error signal by the pulse width modulator to control the duty cycle of the switching power converter.

In accordance with another aspect of the disclosure, a method is provided that includes the acts of: controlling a duty cycle of a switching power converter responsive to a selection from a group of error signals including an input voltage error signal based upon an error in an input voltage to the switching power converter, an input current error signal based upon an error in an input current to the switching power converter, and an output voltage error signal based upon an error in an output voltage of the switching power converter; controlling a conductance of a transistor based upon a difference between a battery current and a battery current threshold to regulate the battery current; and adjusting the battery current threshold based upon the selection from the group of error signals to control the duty cycle of the switching power converter.

In accordance with yet another aspect of the disclosure, a battery charger is provided that includes: a switching power converter configured to generate an output voltage on an output voltage rail; a transistor coupled to the output voltage rail and configured to conduct a battery current; a pulse width modulator configured to control a duty cycle of the switching power converter responsive to a selection from a group of error signals including an input voltage error signal based upon an error in an input voltage to the switching power converter, an input current error signal based upon an error in an input current to the switching power converter, and an output voltage error signal based upon an error in the output voltage; a battery current error amplifier configured to control a conductance of the transistor based upon a difference between the battery current and a battery current threshold; and a battery current throttle circuit configured to decrease the battery current threshold responsive to a selection of the input voltage error signal by the pulse width modulator to control the duty cycle of the switching power converter.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

In the figures, like reference numerals designate corresponding parts throughout the different views.

FIG. 4 illustrates some operating waveforms of the battery charger of FIG. 1 during the QB_REG operating region.

Embodiments of the present disclosure and their advantages are best understood by referring to the detailed description that follows. It should be appreciated that like reference numerals are used to identify like elements illustrated in one or more of the figures.

DETAILED DESCRIPTION

An improved battery charger is provided that includes a DC/DC switching power converter that provides an output voltage to a system through an output power rail. A transistor couples between the output power rail and a rechargeable battery for the system. The system also includes a battery current throttle to control the conductance of the transistor. The battery current throttle controls a digital code such as a count from a counter that is converted by a digital-to-analog converter (DAC) to produce a battery reference current. A battery current error amplifier controls the conductance of the transistor to throttle (reduce) a battery current conducted by the transistor to the rechargeable battery to prevent or reduce the likelihood of the output voltage from reducing below a minimum system voltage level.

Figure 1:
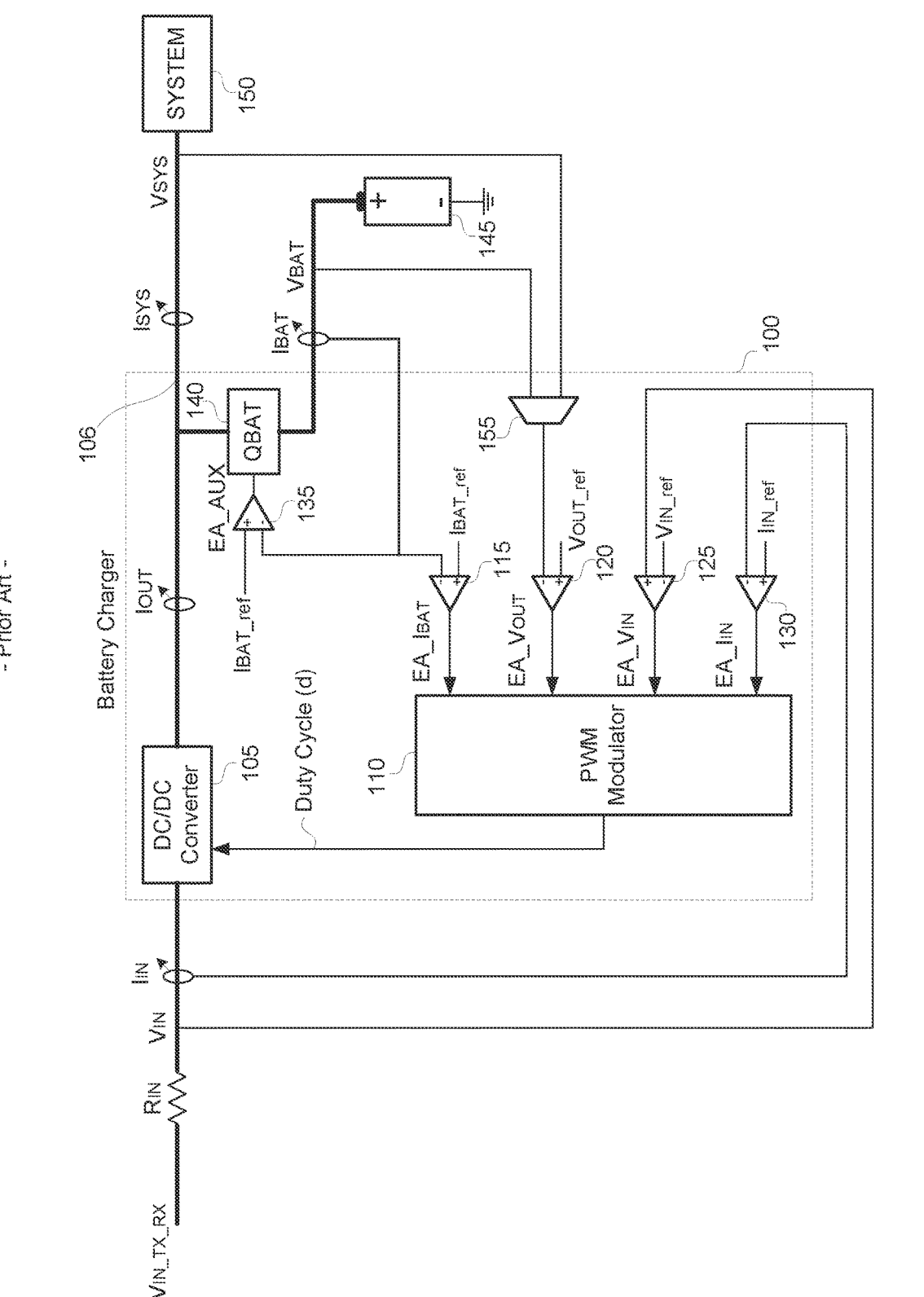
FIG. 1 is a diagram of a conventional battery charger with a series regulator feedback loop.
Figure 2:
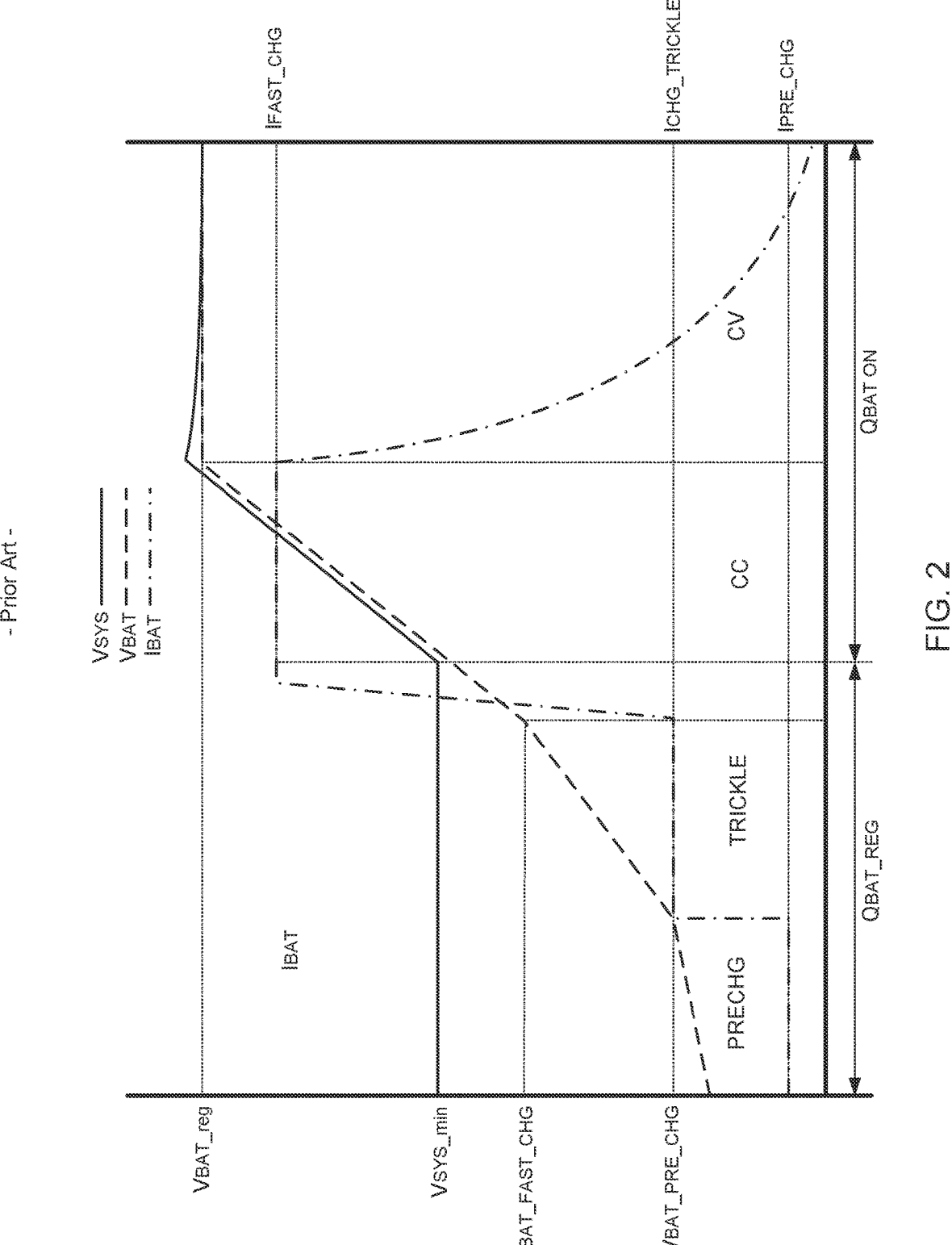
FIG. 2 is a waveform diagram for the battery charger of FIG. 1 during a battery charging procedure.
Figure 3:
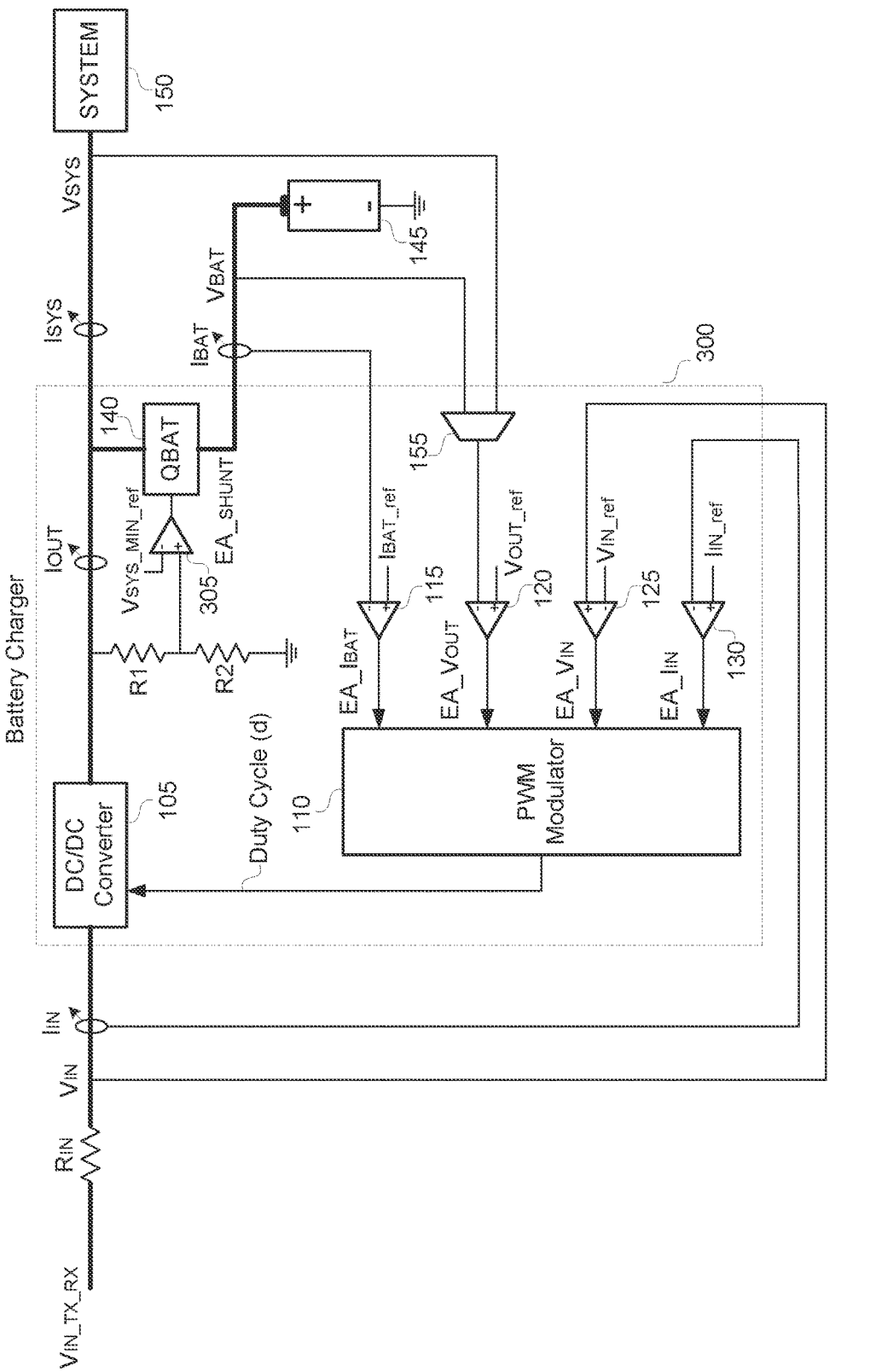
FIG. 3 is a diagram of a conventional battery charger with a shunt regulator feedback loop.
Figure 5:
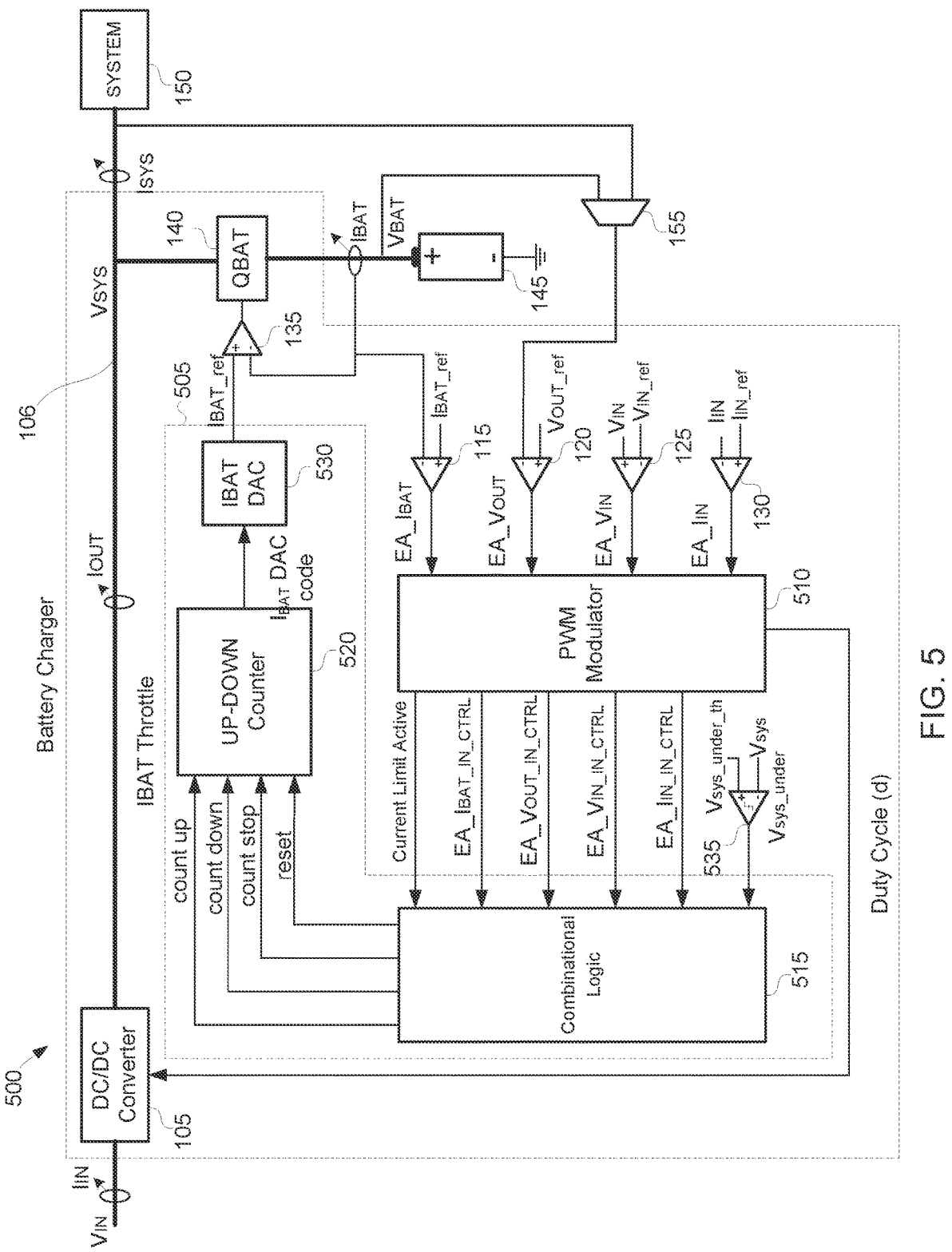
FIG. 5 illustrates an improved battery charger in accordance with an aspect of the disclosure.

An example improved battery charger 500 is shown in FIG. 5. As discussed with regard to charger 100, a DC/DC switching power converter 105 such as a buck converter or a buck/boost converter regulates an output voltage $V_{SYS}$ and a load current $I_{SYS}$ carried on an output power rail 106 to power a system 150. System 150 includes a re-chargeable battery 145 that couples to output power rail 106 through a transistor QBAT 140. An auxiliary battery current error amplifier 135 may control the conductance of QBAT 140 based upon an error signal that is proportional to a difference between a battery current $I_{BAT}$ and a battery current threshold $I_{BAT\_ref}$. System 150 may be any application with a re-chargeable battery 145 such as a mobile device, a wearable device, or an internet-of-things device. Depending upon the conductance of the QBAT transistor 140, an output current $I_{OUT}$ from DC/DC switching power converter 105 is split into the load current $I_{SYS}$ to system 150 and the battery current $I_{BAT}$.

An AC/DC switching power converter (not illustrated) such as a flyback converter may rectify an AC mains voltage to function as an input power source to DC/DC switching power converter 105. With respect to receiving this input power, DC/DC switching power converter 105 has a variable input resistance as represented by a resistance $R_{IN}$. Input resistance $R_{IN}$ produces an ohmic drop on an output voltage $V_{IN\_TX\_RX}$ from the AC/DC switching power converter to produce an input voltage $V_{IN}$ to DC/DC switching power converter 105. The input voltage $V_{IN}$ is lower than the output voltage $V_{IN\_TX\_RX}$ by a product of the input resistance $R_{IN}$ and an input current $I_{IN}$ to DC/DC switching power converter 105. To regulate the input voltage $V_{IN}$ so that the input voltage $V_{IN}$ does not droop below a minimum input voltage threshold, charger 500 includes an input voltage error amplifier (EA_$V_{IN}$) 125 that produces an input voltage error signal responsive to a difference between the input voltage $V_{IN}$ and an input voltage threshold $V_{IN\_ref}$. To regulate the input current $I_{IN}$ so that the input current $I_{IN}$ does not exceed a maximum input current, charger 100 includes an input current error amplifier (EA_$I_{IN}$) 130 that produces an input current error signal responsive to a difference between an input current threshold $I_{IN\_ref}$ and the input current $I_{IN}$.

To regulate a battery voltage $V_{BAT}$ for battery 145 or the output voltage $V_{SYS}$ provided to system 150, battery charger 100 (which may also be denoted as a power adapter 100) includes an output voltage error amplifier (EA_$V_{OUT}$) 120. Depending upon the selection in a multiplexer 155 to provide a selected voltage, the output voltage error amplifier 120 compares either the battery voltage $V_{BAT}$ or the output voltage $V_{SYS}$ to a voltage threshold $V_{OUT\_ref}$ to produce an output voltage error signal. The output voltage error signal is proportional to the difference between the voltage threshold $V_{OUT\_ref}$ and the selected voltage from multiplexer 155.

A battery current error amplifier 115 generates a battery current error signal EA_$I_{BAT}$ based upon a difference between the battery current $I_{BAT}$ and the battery current threshold $I_{BAT\_ref}$. A pulse width modulation (PWM) modulator 510 may then control the duty cycle (d) of a power switch (not illustrated) in DC/DC switching power converter 105 responsive to a selected one of the output voltage error signal, the input current error signal, the input voltage error signal, and the battery current error signal. PWM modulator 510 may thus regulate the duty cycle of the power switch in any given switching cycle based upon one of the error signals from the four error amplifiers 115, 120, 125, and 130. During the initial stages of charging battery 145, the output voltage $V_{SYS}$ is regulated to equal the minimum value $V_{SYS\_MIN}$. During these initial stages, multiplexer 155 thus selects for the output voltage $V_{SYS}$ and PWM modulator 510 adjusts the power switch duty cycle based upon the output voltage error signal accordingly. During this time, note that PWM modulator 510 cannot then respond to the battery current error signal from error amplifier 115. To allow charger 500 to continue to regulate the battery current $I_{BAT}$ despite the regulation of the output voltage $V_{SYS}$ to equal the minimum system voltage $V_{SYS\_MIN}$ during the initial battery charging stages, charger 500 includes the auxiliary battery current error amplifier 135 that produces an auxiliary battery current error signal for the battery current $I_{BAT}$ responsive to a difference between the battery current $I_{BAT}$ and the battery current threshold $I_{BAT\_ref}$. Depending upon the value of the auxiliary battery current error signal, auxiliary error amplifier 135 regulates the conductance of the QBAT transistor 140 to regulate the battery current $I_{BAT}$. In this fashion, charger 500 may simultaneously regulate the output voltage $V_{SYS}$ and the battery current $I_{BAT}$ while the output voltage $V_{SYS}$ is regulated to equal $V_{SYS\_MIN}$.

Figure 4:
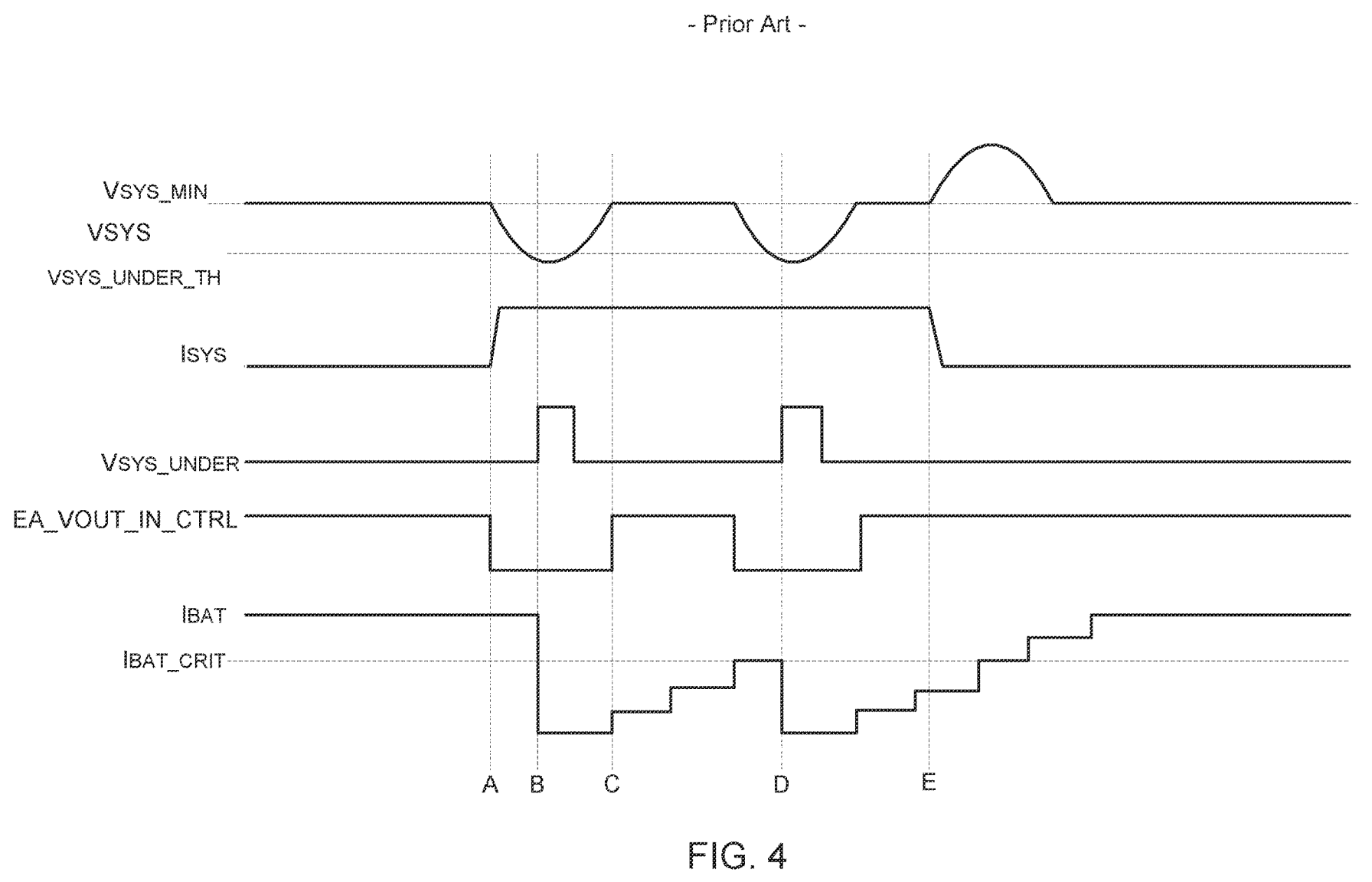

Note that the QBAT transistor 140 functions as a resistance to convert the system voltage $V_{SYS}$ into the battery voltage $V_{BAT}$ (and also the battery current $I_{BAT}$). The regulation of the battery current $I_{BAT}$ by the control of the conductance of QBAT 140 by the auxiliary error amplifier 135 is thus effectively in series with respect to the regulation of the system voltage $V_{SYS}$. This is an important advantage for battery charger 500 as the feedback control of the battery current $I_{BAT}$ is thus substantially decoupled from the feedback control of the output voltage $V_{SYS}$. Despite this same advantage for conventional battery charger 100, the output voltage $V_{SYS}$ was subjected to droops below the minimum system voltage as discussed with regard to FIG. 4.

To prevent or reduce such droops in the output voltage $V_{SYS}$, charger 500 is configured to increase or decrease the battery current threshold $I_{BAT\_ref}$ through a battery current throttle circuit 505 depending upon which error signal pulse width modulator 510 uses to control the duty cycle of the switching power converter 105. A combinational logic circuit 515 may be configured to determine which error signal is used by pulse width modulator 510 to control the duty cycle of switching power converter 105. For example, the assertion of an EA_$I_{BAT\_IN\_CTRL}$ signal indicates to combinational logic circuit 515 that pulse width modulator 510 is currently controlling the duty cycle based upon the battery current error signal EA_$I_{BAT}$ from error amplifier 115. Similarly, the assertion of an EA_$V_{OUT\_IN\_CTRL}$ signal indicates to combinational logic circuit 515 that pulse width modulator 510 is currently controlling the duty cycle based upon the output voltage error signal EA_$V_{OUT}$ from output voltage error amplifier 120. In the same fashion, the assertion of an EA_$V_{IN\_CTRL}$ signal indicates to combinational logic circuit 515 that pulse width modulator 510 is currently controlling the duty cycle based upon the input voltage error signal EA_$V_{IN}$ from input voltage error amplifier 125. Finally, the assertion of an EA_$I_{IN\_IN\_CTRL}$ signal indicates to combinational logic circuit 515 that pulse width modulator 510 is currently controlling the duty cycle based upon the input current error signal EA_$I_{IN}$ from input current error amplifier 130.

Based upon which error signal (and thus feedback loop) is in control of the duty cycle, combinational logic circuit 515 adjusts a count of an up-down counter 520. The count may be designated as an $I_{BAT}$ DAC code. A digital-to-analog converter 530 converts the count (the $I_{BAT}$ DAC code) from up-down counter 520 to produce the battery current threshold $I_{BAT\_ref}$. To control the count (and thus control the battery current threshold $I_{BAT\_ref}$), combinational logic circuit 515 may assert a count up signal to force up-down counter 520 to increment the count. Conversely, combinational logic circuit 515 may assert a count down signal to force up-down counter to decrement the count. A reset signal resets the count to a default value whereas a count stop signal stops any incrementing or decrementing of the count.

To assist in the control of the count, pulse width modulator 510 may also assert a current limit active signal when a current limit is active in switching power converter 105. In addition, a comparator 535 may assert a transient response signal should the output voltage $V_{SYS}$ fall below a system under voltage threshold $V_{SYS\_under\_th}$. Combinational logic circuit 515 may respond to the assertion of the transient response signal $V_{SYS\_UNDER}$ by comparator 535 with an assertion of the reset signal so that up-down counter 520 resets the count to a pre-defined level, which assists in the recovery of the output voltage $V_{SYS}$.

In one implementation, combinational logic circuit 515 may decrement the count by one code of its dynamic range if the $EA\_V_{OUT\_IN\_CTRL}$ signal is zero (a binary false state) and one of the following conditions is satisfied: the $EA\_I_{IN\_IN\_CTRL}$ signal is one (a binary true state), the $EA\_V_{IN\_IN\_CTRL}$ signal is one, or the current limit is active. Should the count be decremented to a lowest possible code (e.g., a code 0), the counter 520 stops any further decrementing. Conversely, combinational logic circuit 515 may increment the count by one bit of its dynamic range if the $EA\_V_{OUT\_IN\_CTRL}$ signal equals one and one of the following conditions is satisfied: the $EA\_I_{IN\_IN\_CTRL}$ signal is 0, the $EA\_V_{IN\_IN\_CTRL}$ signal is 0, or the current limit is not active. When the counter reaches a default level such that $I_{BAT\_ref}$ equals a default value, counter 520 stops any further incrementing. Note that the default level of $I_{BAT\_ref}$ equals one of $I_{PRE\_CHG}$, $I_{CHG\_TRICKLE}$, or $I_{FAST\_CHG}$ depending upon the charge profile.

In some implementations, the amount of incrementing and decrementing based upon which error signal is being selected by PWM modulator 510 to control the duty cycle of switching power converter 105 may be tuned such as through a one-time programmable (OTP) configuration of battery charger 500. Some example operating scenarios for battery charger 500 will now be discussed.

Figure 6:
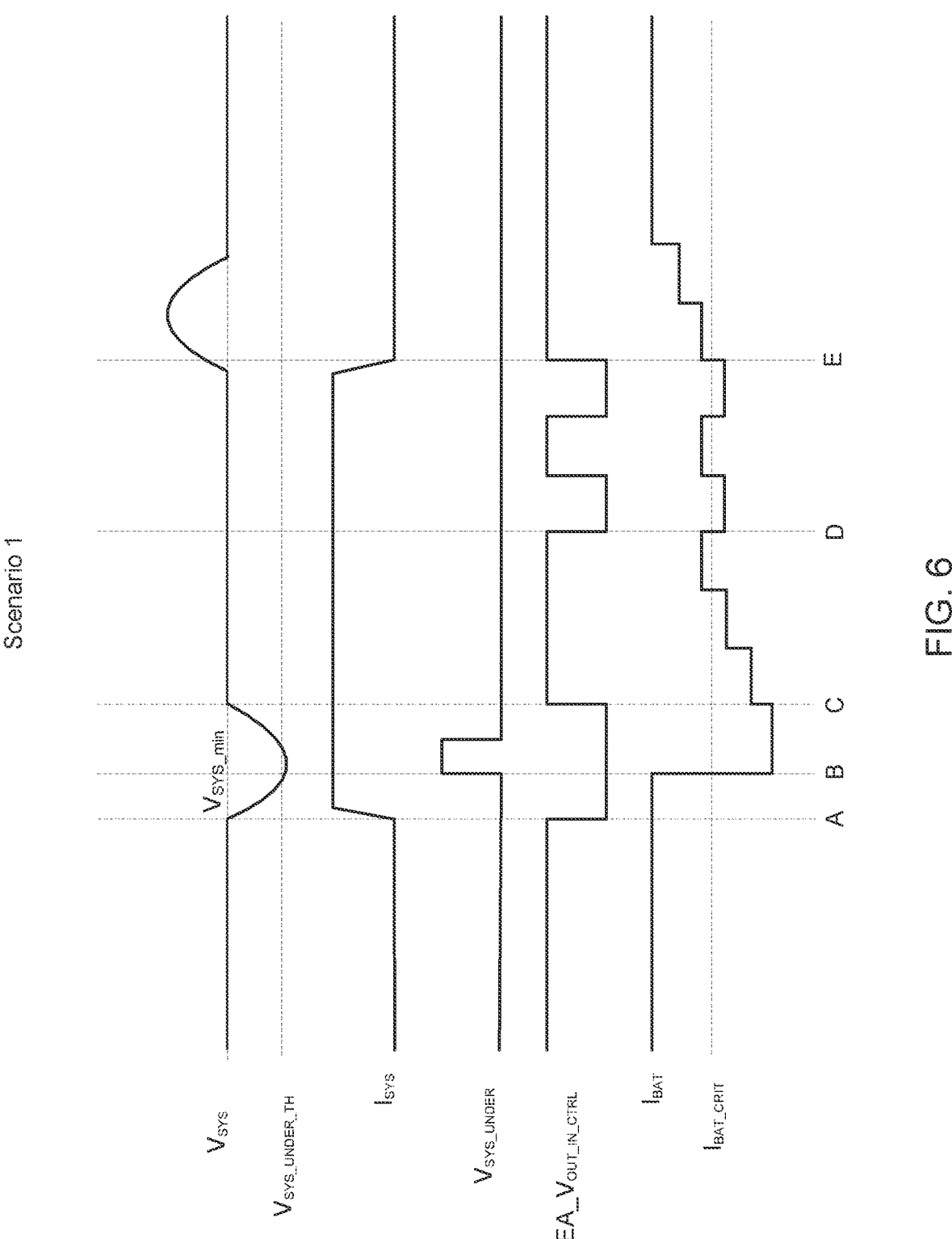
FIG. 6 illustrates some operating waveforms for the improved battery charger of FIG. 5 during a first scenario in which there is a sudden demand in the output current $I_{SYS}$ while the battery current $I_{BAT}$ is being regulated to a default level.

A first scenario (Scenario 1) is shown in FIG. 6. Scenario 1 occurs when a system load causes a sudden demand in the load current $I_{SYS}$ while the battery current $I_{BAT}$ is being regulated to a default level such as $I_{FAST\_CHG}$. Prior to a time A, PWM modulator 510 was selecting for the output voltage error signal from error amplifier 120 for the duty cycle control so that the output voltage $V_{SYS}$ is regulated to the minimum system voltage $V_{SYS\_MIN}$. At time A, the load current $I_{SYS}$ increases with a relatively high slew rate. This increase in the load current $I_{SYS}$ causes PWM modulator 510 to stop controlling the duty cycle based upon the output voltage error signal. The output voltage $V_{SYS}$ thus collapses (droops) to cross the under voltage threshold $V_{SYS\_UNDER\_TH}$ at a time B. Comparator 535 then asserts the transient response signal (designated as $V_{SYS\_UNDER}$), which causes the reset of the count. In addition, the lack of control by the output voltage error signal causes a decrementing of the count, which in turn causes auxiliary battery current error amplifier 135 to throttle (reduce) the battery current $I_{BAT}$ so that the output voltage $V_{SYS}$ recovers at a time C to again equal the minimum system voltage $V_{SYS\_MIN}$. This recovery in the output voltage $V_{SYS}$ causes pulse width modulator 510 to again use the output voltage error signal to control the duty cycle, which causes the $EA\_V_{OUT\_IN\_CTRL}$ signal to equal 1. The count then begins to increment until the count causes the battery current $I_{BAT}$ to exceed the critical value $I_{BAT\_CRIT}$. The count will then begin to dither up and down at a time D, to cause the battery current $I_{BAT}$ to dither about the critical value $I_{BAT\_CRIT}$. At a time E, the load current $I_{SYS}$ decreases, which causes the $EA\_V_{OUT\_IN\_CTRL}$ signal to equal one. The count will then continue to increment until the battery current reaches a default level (e.g, $I_{FAST\_CHG}$). The sudden decrease of the load current $I_{SYS}$ causes a mild overshoot of the output voltage $V_{SYS}$ above the minimum system voltage $V_{SYS\_MIN}$.

Figure 7:
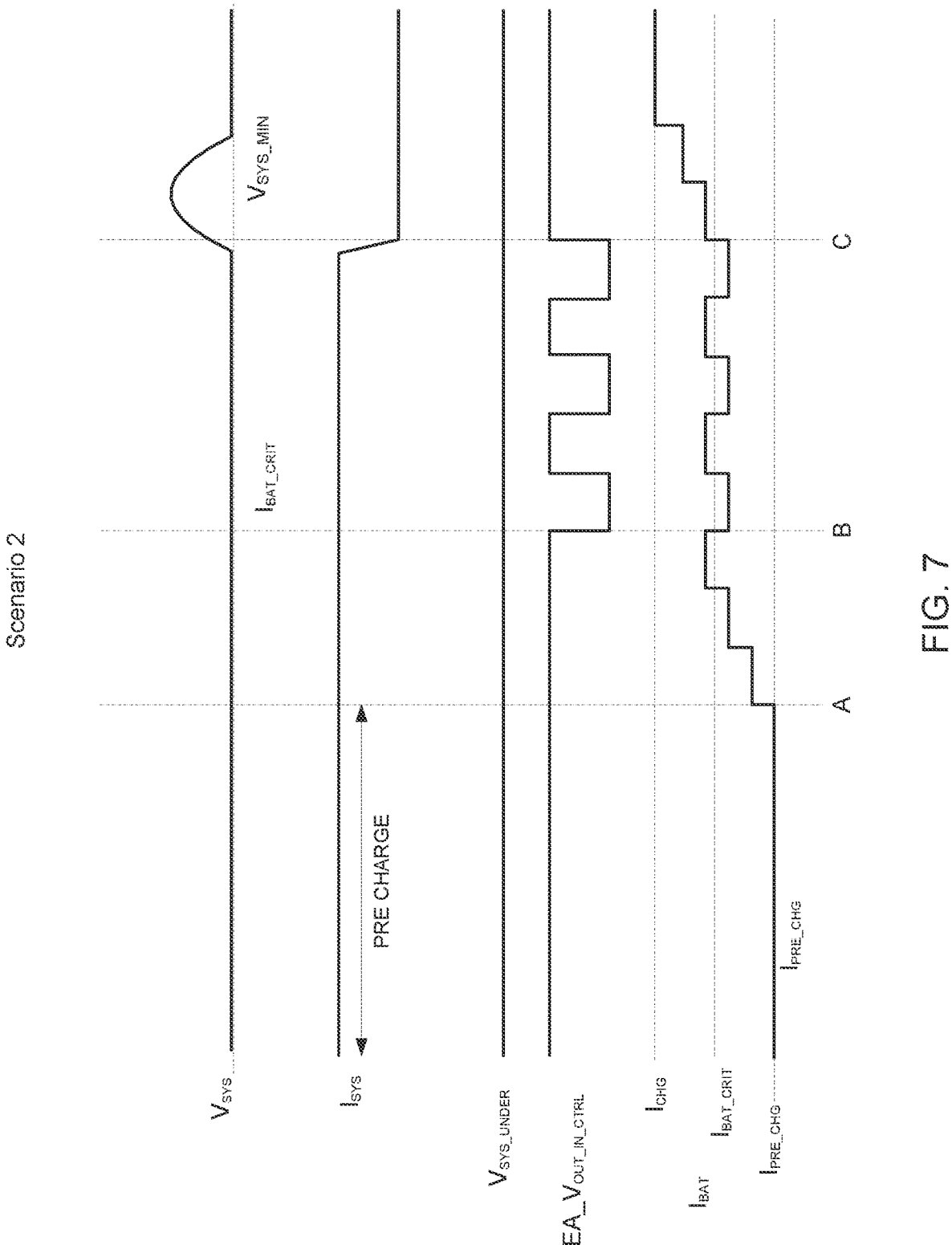
FIG. 7 illustrates some operating waveforms for the improved battery charger of FIG. 5 during a second scenario in which the battery current $I_{BAT}$ changes in the presence of a load current ($I_{SYS}$).

A second scenario (Scenario 2) is shown in FIG. 7. Scenario 2 occurs when the battery current $I_{BAT}$ changes default levels (e.g., from $I_{CHG\_TRICKLE}$ to $I_{FAST\_CHG}$) in the presence of a load current $I_{SYS}$. Prior to a time A, PWM modulator 510 was selecting for the output voltage error signal from error amplifier 120 for the duty cycle control so that the output voltage $V_{SYS}$ is regulated to the minimum system voltage $V_{SYS\_MIN}$. At time A, the battery current $I_{BAT}$ begins to increase from the $I_{PRE\_CHG}$ level. At a time B, the battery current rises to $I_{BAT\_CRIT}$. PWM modulator 510 then begins to dither between controlling the duty cycle based upon the battery current error signal or the output voltage error signal. The $EA\_V_{OUT\_IN\_CTRL}$ signal thus dithers between one and zero after time B. At a time C, the load current $I_{SYS}$ reduces (a reduction in the system load), which causes the $EA\_V_{OUT\_IN\_CTRL}$ signal to again equal one. The reduction in the load current $I_{SYS}$ at time C causes a minor overshoot of the output voltage $V_{SYS}$ above the minimum system voltage $V_{SYS\_MIN}$.

Figure 8:
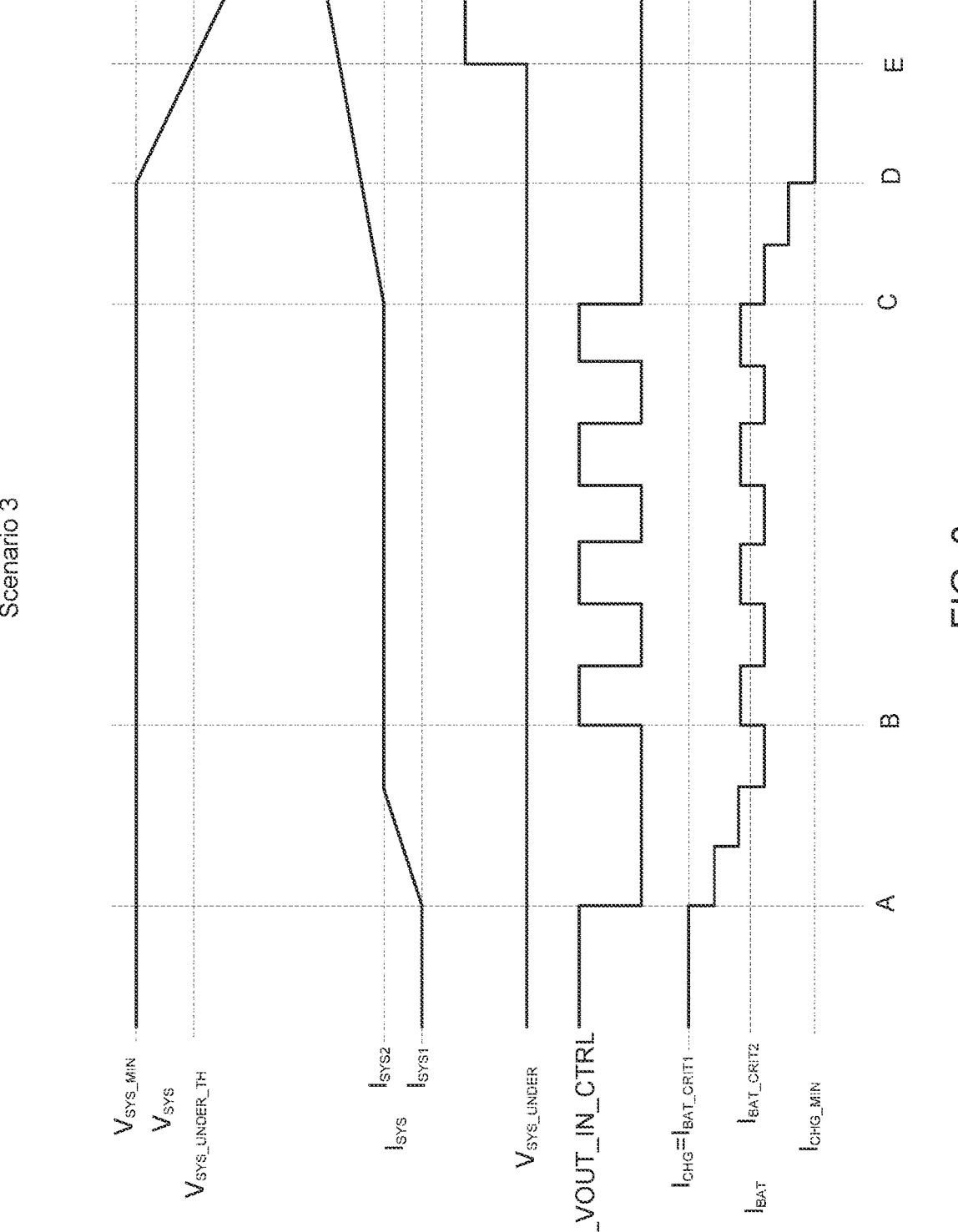
FIG. 8 illustrates some operating waveforms for the improved battery charger of FIG. 5 during a third scenario in which the system current ($I_{SYS}$) gradually increases while the battery is being charged.

A third scenario (Scenario 3) is shown in FIG. 8. Scenario 3 occurs when the load current $I_{SYS}$ gradually increases from a lower level $I_{SYS1}$ to a higher level $I_{SYS2}$ while the battery current $I_{BAT}$ is regulated to a default level such as to $I_{FAST\_CHG}$. Prior to a time A, PWM modulator 510 was selecting for the output voltage error signal from error amplifier 120 for the duty cycle control so that the output voltage $V_{SYS}$ is regulated to the minimum system voltage $V_{SYS\_MIN}$. The increase in the load current $I_{SYS}$ begins at time A, which causes the $EA\_V_{OUT\_IN\_CTRL}$ signal to fall to zero. The count then starts to decrement, which causes the battery current $I_{BAT}$ to fall below $I_{BAT}$_CRIT at a time B, which causes the $EA\_V_{OUT\_IN\_CTRL}$ signal to begin to be dithered between one and zero. The battery current $I_{BAT}$ then also dithers about $I_{BAT\_CRIT}$, until a time C when the load current $I_{SYS}$ is again increased. This increase in the load current $I_{SYS}$ causes the $EA\_V_{OUT\_IN\_CTRL}$ signal to fall to zero. The count is then decremented to the lowest possible code at a time D. Since the load current $I_{SYS}$ continues to increase after time D and no further throttling of the battery current $I_{BAT}$ can be produced, the output voltage $V_{SYS}$ begins to fall, until the $V_{SYS\_UNDER}$ threshold is crossed at a time E.

Note the advantages of the controlling the battery current $I_{BAT}$ based upon a current threshold that is increased or decreased based upon whether the duty cycle is being controlled by the output voltage error signal or the input voltage/input current error signals. As discussed with regard to conventional charger 100, it is advantageous to control the conductance of the QBAT transistor 140 based upon a difference between the battery current $I_{BAT}$ and a threshold current $I_{BAT\_ref}$ because the resulting control of the battery current $I_{BAT}$ is effectively in series with the control of the output voltage $V_{SYS}$. But the output voltage $V_{SYS}$ is then subjected to unwanted droops below the minimum system voltage $V_{SYS\_min}$ such as in the presence of sudden increases in the load current. The shunt feedback discussed with regard to charger 300 can more robustly regulate the output voltage $V_{SYS}$ in the presence of such load transients but the resulting shunt feedback then has a complicated interaction with the regulation of the output voltage $V_{SYS}$ that can lead to instabilities. In contrast, charger 500 has an improved output voltage regulation analogous to that provided by a conventional shunt feedback approach but with the stability of the battery current feedback loop being effectively in series with the output voltage feedback loop.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed:

1. A switching power converter controller, comprising:
a multiplexer configured to select between an output voltage of a switching power converter and a battery voltage from a battery to provide a selected voltage, wherein the switching power converter is configured to drive an output voltage rail with the output voltage;
a voltage error amplifier configured to amplify a difference between the selected voltage and a voltage threshold to generate an output voltage error signal;
a pulse width modulator configured to control a duty cycle of the switching power converter responsive to a selection from a group of error signals including an input voltage error signal based upon an error in an input voltage to the switching power converter, an input current error signal based upon an error in an input current to the switching power converter, and the output voltage error signal;
a battery current error amplifier configured to generate a battery current error signal based upon a difference between a battery current to the battery and a battery current threshold, wherein the battery current error amplifier is further configured to control a conductance of a transistor responsive to the battery current error signal to control a magnitude of the battery current, and wherein the transistor couples between the output voltage rail and the battery; and
a battery current throttle circuit configured to increase the battery current threshold responsive to the selection of the output voltage error signal by the pulse width modulator to control the duty cycle of the switching power converter and to decrease the battery current threshold responsive to the selection of the input current error signal by the pulse width modulator to control the duty cycle of the switching power converter.

2. The switching power converter controller of claim 1, wherein the battery current throttle circuit comprises:
a counter configured to adjust a count responsive to the selection from the group of error signals, wherein the counter is further configured to increase the count responsive to the selection of the output voltage error signal by the pulse width modulator to control the duty cycle of the switching power converter; and
a digital-to-analog-converter configured to convert the count into the battery current threshold.

3. The switching power converter controller of claim 2, wherein the counter is further configured to increase the count until a maximum count is reached responsive to the selection of the output voltage error signal by the pulse width modulator to control the duty cycle of the switching power converter, and wherein the digital-to-analog-converter is further configured to convert the maximum count so that the battery current threshold equals a reference battery current threshold.

4. The switching power converter controller of claim 2, wherein the counter is further configured to decrement the count responsive to the selection of the input voltage error signal by the pulse width modulator to control the duty cycle of the switching power converter.

5. The switching power converter controller of claim 2, wherein the counter is further configured to stop a decrement of the count responsive to the count being equal to zero.

6. The switching power converter controller of claim 2, wherein the switching power converter is a DC/DC switching power converter.

7. The switching power converter controller of claim 6, wherein the DC/DC switching power converter is a buck converter.

8. A method, comprising:
selecting between an output voltage of a switching power converter and a battery voltage to provide a selected voltage;
generating an output voltage error signal by amplifying a difference between a voltage threshold and the selected voltage;
controlling a duty cycle of the switching power converter responsive to a selection from a group of error signals including an input voltage error signal based upon an error in an input voltage to the switching power converter, an input current error signal based upon an error in an input current to the switching power converter, and the output voltage error signal;
controlling a conductance of a transistor based upon a difference between a battery current and a battery current threshold to regulate the battery current;
incrementing a count responsive to a selection of the output voltage error signal for the controlling of the duty cycle of the switching power converter;
decrementing the count responsive to a selection of the input current error signal for the controlling of the duty cycle of the switching power converter; and
converting the count in a digital-to-analog converter to form the battery current threshold.

9. The method of claim 8, further comprising:
decrementing the count responsive to a selection of the input voltage error signal for the controlling of the duty cycle of the switching power converter.

10. The method of claim 9, wherein controlling the duty cycle of the switching power converter comprises controlling the duty cycle of a buck converter.

11. A battery charger, comprising:
a switching power converter configured to generate an output voltage on an output voltage rail;
a transistor coupled to the output voltage rail and configured to conduct a battery current to a battery;
a multiplexer configured to select between the output voltage and a battery voltage from the battery to provide a selected voltage;
an output voltage error amplifier configured to amplify a difference between the selected voltage and a voltage threshold to generate an output voltage error signal;
a pulse width modulator configured to control a duty cycle of the switching power converter responsive to a selection from a group of error signals including an input voltage error signal based upon an error in an input voltage to the switching power converter, an input current error signal based upon an error in an input current to the switching power converter, and the output voltage error signal;
a battery current error amplifier configured to control a conductance of the transistor based upon a difference between the battery current and a battery current threshold; and
a battery current throttle circuit configured to decrease the battery current threshold responsive to the selection of the input voltage error signal by the pulse width modulator to control the duty cycle of the switching power converter and to increase the battery current threshold responsive to the selection of the output voltage error signal by the pulse width modulator to control the duty cycle of the switching power converter.

12. The battery charger of claim 11, wherein the battery current throttle circuit is further configured to decrease the battery current threshold responsive to a selection of the input current error signal by the pulse width modulator to control the duty cycle of the switching power converter.

13. The battery charger of claim 11, wherein the battery current throttle circuit comprises:

a counter configured to increment a count responsive to the selection of the output voltage error signal by the pulse width modulator to control the duty cycle of the switching power converter, wherein the counter is further configured to decrement the count responsive to a selection of the input current error signal or the input voltage error signal by the pulse width modulator to control the duty cycle of the switching power converter; and a digital-to-analog-converter configured to convert the count to form the battery current threshold.

\* \* \* \* \*